(12) United States Patent
Cheng et al.

(10) Patent No.: US 11,882,052 B2
(45) Date of Patent: Jan. 23, 2024

(54) UPDATING FLOW CACHE INFORMATION FOR PACKET PROCESSING

(71) Applicant: VMware, Inc., Palo Alto, CA (US)

(72) Inventors: Xi Cheng, Beijing (CN); Caixia Jiang, Beijing (CN); Xiaoyan Jin, Beijing (CN); Qiong Wang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 99 days.

(21) Appl. No.: 17/197,397

(22) Filed: Mar. 10, 2021

(65) Prior Publication Data
US 2022/0231961 A1 Jul. 21, 2022

(30) Foreign Application Priority Data

Jan. 20, 2021 (WO) ................ PCT/CN2021/072827

(51) Int. Cl.
*H04L 47/62* (2022.01)
*H04L 45/74* (2022.01)
*H04L 67/568* (2022.01)

(52) U.S. Cl.
CPC .............. *H04L 47/62* (2013.01); *H04L 45/74* (2013.01); *H04L 67/568* (2022.05)

(58) Field of Classification Search
CPC ........ H04L 47/62; H04L 45/74; H04L 67/568
See application file for complete search history.

(56) References Cited

U.S. PATENT DOCUMENTS

| 9,998,371 | B2 * | 6/2018 | Shen | H04L 12/4641 |
|---|---|---|---|---|
| 2016/0036723 | A1 * | 2/2016 | Hao | H04L 47/80 |
| | | | | 370/392 |
| 2016/0094384 | A1 * | 3/2016 | Jain | H04L 67/14 |
| | | | | 709/221 |
| 2017/0195255 | A1 * | 7/2017 | Pham | H04L 12/4633 |

(Continued)

OTHER PUBLICATIONS

Ben Pfaff et al., "The Design and Implementation of Open vSwitch", Proceedings of the 12th USENIX Symposium on Networked Systems Design and Implementation, May 4-6, 2015, pp. 117-130, Oakland, CA, USA.

(Continued)

*Primary Examiner* — Kodzovi Acolatse
*Assistant Examiner* — Anindita Sen
(74) *Attorney, Agent, or Firm* — King Intellectual Asset Management

(57) ABSTRACT

Example methods and systems to perform flow cache information update(s) for packet processing are described. In one example, a network element may configure flow cache information specifying a set of actions based on a sequence of stages that is executable during slow-path packet processing. The network element may configure dependency information specifying execution dependence or independence among the set of actions during fast-path packet processing. In response to detecting a configuration change associated with stage(s) from the sequence of stages, the network element may identify first action(s) affected by the configuration change and second action(s) not affected by (Continued)

the configuration change. This way, a granular update may be performed to the flow cache information by updating the at least one first action, but not the at least one second action.

21 Claims, 8 Drawing Sheets

(56) References Cited

U.S. PATENT DOCUMENTS

| | | | |
|---|---|---|---|
| 2017/0237664 A1* | 8/2017 | Jackson | H04L 45/7453 370/392 |
| 2017/0237668 A1* | 8/2017 | Hall | H04L 47/2466 370/235 |
| 2019/0149518 A1* | 5/2019 | Sevinc | H04L 63/0263 726/11 |

OTHER PUBLICATIONS

"PS225—Dual-Port 25GbE PCIe Ethernet SmartNIC", Broadcom, 2019, Retrieved on Feb. 18, 2021 from URL: https://www.broadcom.com/products/ethernet-connectivity/network-adapters/smartnic/ps225>.

"Marvell® LiquidIO™ III—An inline DPU based SmartNIC for cloud network and security acceleration", Marvell Technology Group Ltd., Revised on Sep. 20, 2020.

"BlueField™ SmartNIC Ethernet", NVIDIA Networking, Retrieved on Feb. 18, 2021 from URL: <https://www.mellanox.com/products/BlueField-SmartNIC-Ethernet>.

B. Claise, Ed et al., "Specification of the IP Flow Information Export (IPFIX) Protocol for the Exchange of Flow Information", Internet Engineering Task Force (IETF), Sep. 2013, pp. 76.

B. Claise, Ed et al., "Cisco Systems NetFlow Services Export Version 9", Network Working Group, Oct. 2004, pp. 33.

* cited by examiner

810

| S1 | S2 | S3 | S4 | S5 | S6 | S7 | S8 |
|---|---|---|---|---|---|---|---|
| A1 | A2 | A3 | A4 | A5 | A6 | A7 | A8 |
| D1=1 | D2=1 | D3=0 | D4=1 | D5=1 | D6=0 | D7=0 | D8=0 |
| V1=1 | V2=1 | V3=0 | V4=1 | V5=1 | V6=1 | V7=1 | V8=1 |

813 LAST_VALID_CACHED_STAGE=S2 → PERFORM (A1,A2) THEN PUNT PKT TO S3

⬇ INSTALL S3, LEARN A3
811

| S1 | S2 | S3 | S4 | S5 | S6 | S7 | S8 |
|---|---|---|---|---|---|---|---|
| A1 | A2 | A3 | A4 | A5 | A6 | A7 | A8 |
| D1=1 | D2=1 | D3=0→1 | D4=1 | D5=1 | D6=0 | D7=0 | D8=0 |
| V1=1 | V2=1 | V3=0→1 | V4=1 | V5=1 | V6=1 | V7=1 | V8=1 |

| S1 | S2 | S3 | S4 | S5 | S6 | S7 | S8 |
|---|---|---|---|---|---|---|---|
| A1 | A2 | A3 | A4 | A5 | A6 | A7 | A8 |
| D1=1 | D2=1 | D3=1 | D4=1 | D5=1 | D6=0 | D7=0 | D8=0 |
| V1=1 | V2=1 | V3=1 | V4=1 | V5=1 | V6=1 | V7=1 | V8=1 |

⬇ UNINSTALL S4, INVALIDATE A4
821

| S1 | S2 | S3 | S4 | S5 | S6 | S7 | S8 |
|---|---|---|---|---|---|---|---|
| A1 | A2 | A3 | A4 | A5 | A6 | A7 | A8 |
| D1=1 | D2=1 | D3=1 | D4=1→0 | D5=1 | D6=0 | D7=0 | D8=0 |
| V1=1 | V2=1 | V3=1 | V4=1→0 | V5=1 | V6=1 | V7=1 | V8=1 |

822

823 LAST_VALID_CACHED_STAGE=S3 → PERFORM (A1,A2,A3) THEN PUNT PKT TO S4

Fig. 8B

UPDATING FLOW CACHE INFORMATION FOR PACKET PROCESSING

CROSS-REFERENCE TO RELATED APPLICATION

The present application claims the benefit of Patent Cooperation Treaty (PCT) Application No. PCT/CN2021/072827, filed Jan. 20, 2021, which is incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, it is desirable to improve packet processing in the SDN environment, such as datapath acceleration using flow cache information.

BRIEF DESCRIPTION OF DRAWINGS

FIG. 8A is a schematic diagram illustrating a second example of flow cache information update based on a configuration change; and FIG. 8B is a schematic diagram illustrating a third example of flow cache information update based on a configuration change.

DETAILED DESCRIPTION

Figure 1:
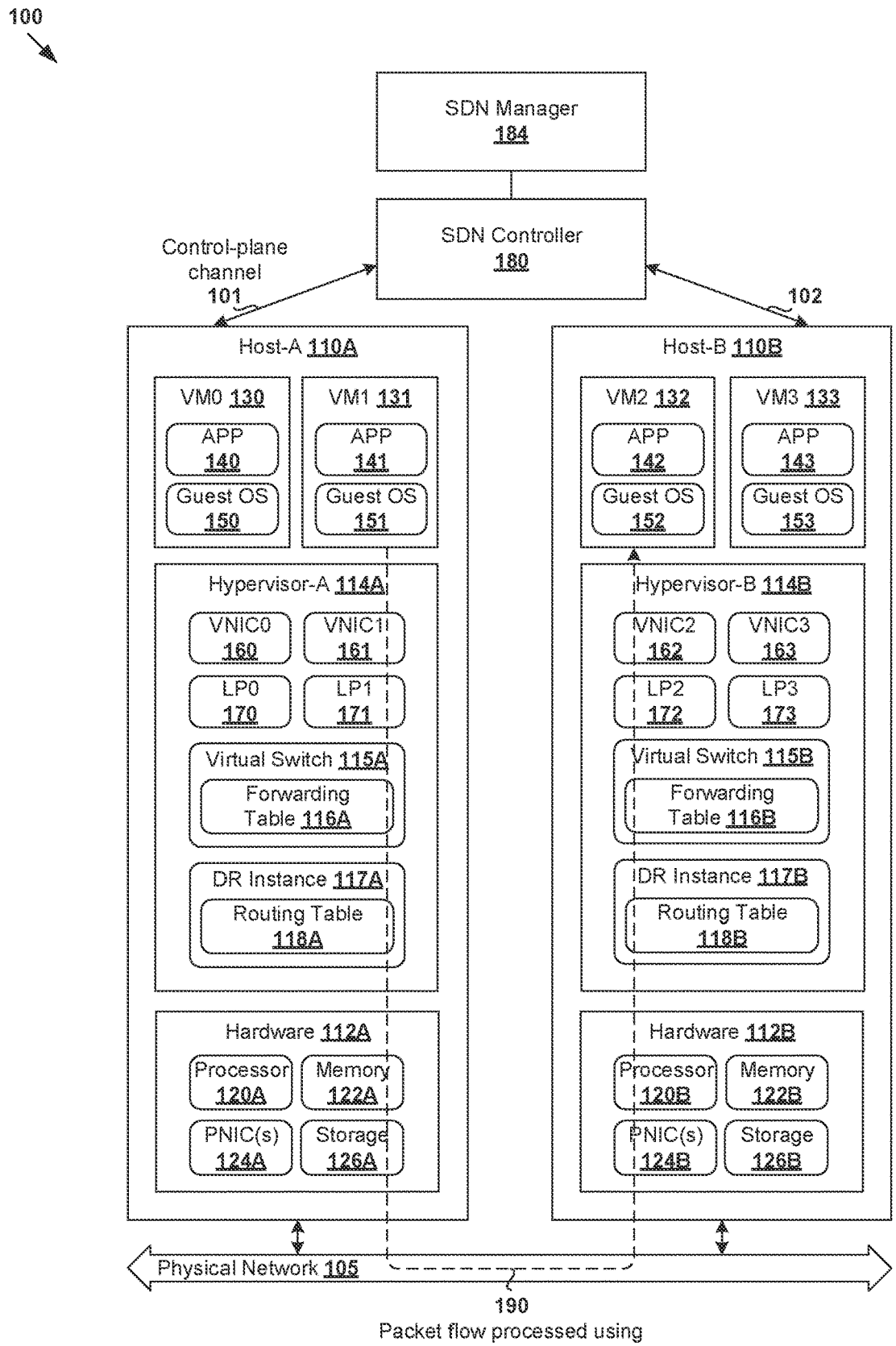
FIG. 1 is a schematic diagram illustrating an example software-defined networking (SDN) environment in which flow cache information update(s) for packet processing may be performed.

According to examples of the present disclosure, flow cache information for fast-path packet processing may be updated in a more efficient manner. In one example, a network element (e.g., physical or logical network element) may configure flow cache information specifying a set of actions based on a sequence of stages that is executable during slow-path packet processing. The network element may configure dependency information specifying execution dependence or independence among the set of actions during fast-path packet processing. In response to detecting a configuration change associated with stage(s) from the sequence of stages, the network element may identify first action(s) affected by the configuration change and second action(s) not affected by the configuration change based on the dependency information. This way, a granular update may be performed to the flow cache information by updating the first action(s), but not the second action(s). Using examples of the present disclosure, unnecessary flow cache information updates may be reduced to improve efficiency.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In more detail, FIG. 1 is a schematic diagram illustrating example software-defined networking (SDN) environment 100 in which flow cache information update(s) for packet processing may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various virtual machines (VMs). For example, hosts 110A-B may support respective VMs 130-133. Hardware 112A/112B includes suitable physical components, such as central processing unit(s) (CPU(s)) or processor(s) 120A/120B; memory 122A/122B; physical network interface controllers (PNICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of VMs.

Hypervisor 114A/114B maintains a mapping between underlying hardware 112A/112B and virtual resources allocated to respective VMs. Virtual resources are allocated to respective VMs 130-133 to each support a guest operating system (OS) and application(s); see 140-143 and 150-153. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 160-163 are virtual network adapters for VMs 130-133, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" (L2) may refer generally to a link layer or media access control (MAC) layer; "layer-3" (L3) to a network or Internet Protocol (IP) layer; and "layer-4" (L4) to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 170-173 are associated with respective VMs 130-133. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as logical overlay networks) may be provisioned, changed, stored, deleted and restored programmatically without having to reconfigure the underlying physical hardware architecture. To facilitate logical network traffic among VMs 130-133, host 110A/110B may encapsulate and decapsulate packets with an outer header identifying a logical overlay network. For example, a logical overlay tunnel may be established between a pair of virtual tunnel endpoints (VTEPs) implemented by respective hosts 110A-B. For example, hypervisor-A 114A may implement a first VTEP (not shown) associated with (IP address=IP-A, MAC address=MAC-A, VTEP label=VTEP-A) and hypervisor-B 114B a second VTEP (not shown) with (IP-B, MAC-B, VTEP-B). Encapsulated packets may be sent via a logical overlay tunnel established between a pair of VTEPs over physical network 105, over which respective hosts 110A-B are in layer-3 connectivity with one another. Any suitable tunneling protocol may be used, such as Virtual eXtensible Local Area Network (VXLAN), Stateless Transport Tunneling (STT), Generic Network Virtualization Encapsulation (GENEVE), etc.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with SDN controller 180 via control-plane channel 101/102.

Network Element

Figure 2:
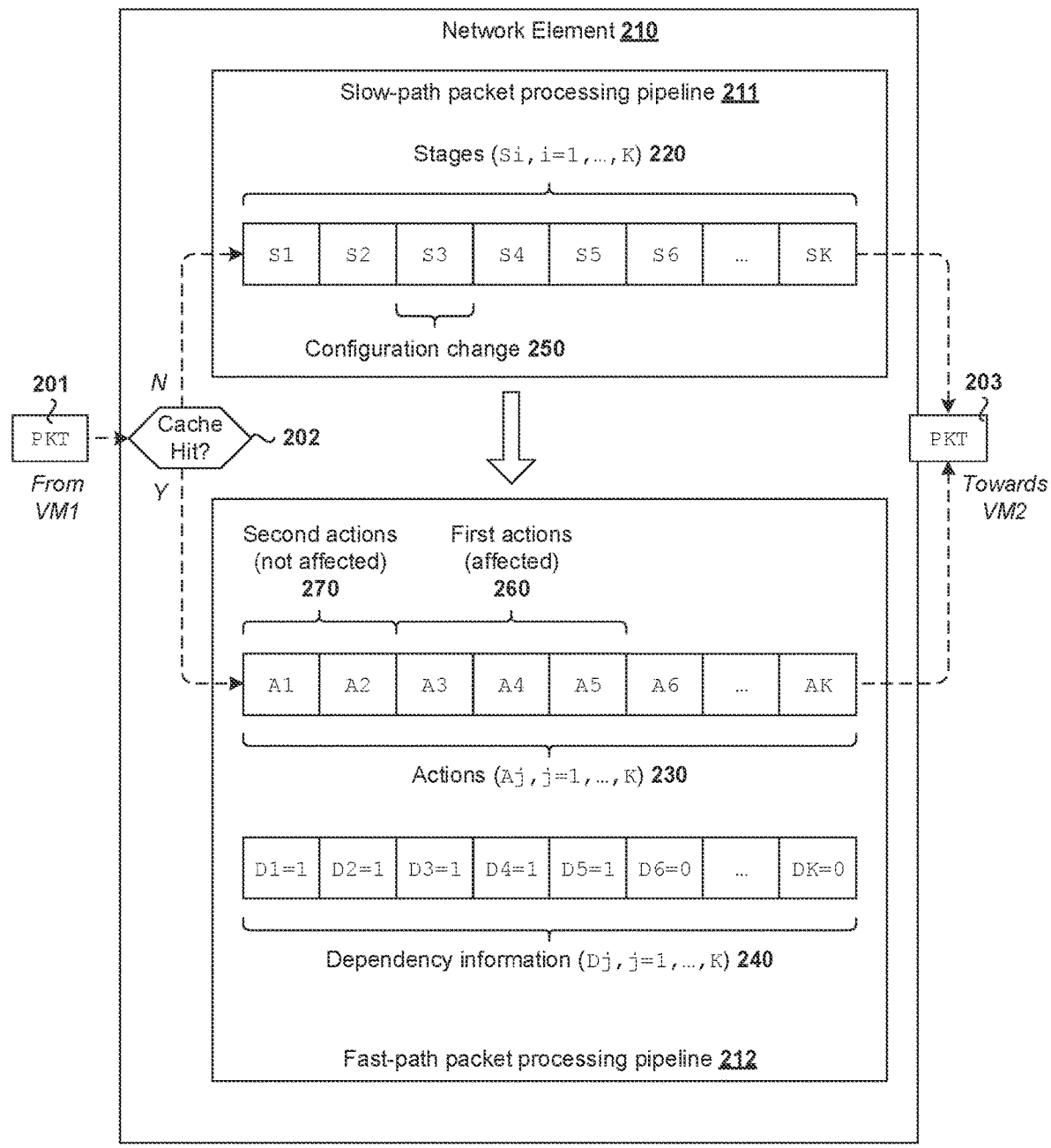
FIG. 2 is a schematic diagram illustrating an example network element to perform flow cache information update(s) for packet processing.

FIG. 2 is a schematic diagram illustrating example network element 210 to perform flow cache information update(s) for packet processing. As used herein, the term "network element" or "computer system" may refer generally to a logical or physical entity capable of packet processing along a datapath between a pair of endpoints (e.g., VM1 131 and VM2 132 in FIG. 1). Example physical network elements may include physical switches and/or physical routers connecting hosts 110A-B over physical network 105 in FIG. 1. Example logical network elements may include logical switches, logical routers, edge appliances, etc.

For example, as described using FIG. 1, logical switches may be implemented using virtual switches 115A-B and logical routers using DR instances 117A-B on respective hosts 110A-B. At an edge appliance (not shown) deployed at the edge of a data center site, a logical router may include a logical distributed router (DR) and a logical service router (SR). In general, a logical DR is responsible for one-hop distributed routing between logical switches and/or logical routers, while an SR is responsible for delivering services in a centralized manner (e.g., firewall, load balancing, network address translation (NAT), intrusion detection and deep packet inspection). Using a two-tier topology, a logical router may be an upper tier-0 (T0) logical router (T0-LR) associated with a data center provider and a lower tier-1 (T1) logical router (T1-LR) associated with a data center tenant.

Conventionally, packet processing is generally performed using a "slow-path" processing pipeline (i.e., without any flow cache support), which might increase the likelihood of a bottleneck at network element 210 as the volume of traffic increases. In practice, slow-path processing may be inefficient because, inter alia, it is necessary to repeat the same packet processing steps on each and every packet from the same packet flow. In some cases, each packet might have to go through a large number of checks and/or lookups against different datapath tables during slow-path processing. Such inefficiency may in turn affect the performance of hosts 110A-B and VMs 130-133.

To facilitate datapath acceleration, network element 210 may be configured to perform packet processing based on flow cache information, such as in the form of a flow table with multiple flow entries. Each flow entry may include a set of match fields to be matched to a packet's header and/or payload information and corresponding action(s) to be performed when a match is found. Example actions may include forwarding a packet via a specific interface (e.g., physical port, logical port), modifying header and/or payload information, dropping the packet, etc. Given a set of logical network configurations, packets belonging to the same packet flow may be processed using the same set of actions on the data plane.

In the example in FIG. 2, network element 210 may include two packet processing pipelines 211-212. Slow-path processing pipeline 211 may include a sequence of multiple (K) slow-path stages (see 220) denoted as Si, where i=1, . . . , K. Each stage may be performed in response to detecting a "flow cache miss" event where a packet is not matched to any flow cache information (see 201, 202, 203). Fast-path processing pipeline 212 may include a set of multiple (K) actions (see 230) denoted as Aj, where j=1, . . . , K that are performed in response to a "flow cache hit" event. A particular action (Aj) in fast-path processing pipeline 212 may be configured or recorded based on a corresponding stage (Si) in slow-path processing pipeline 211, such as A1 based on S1, A2 based on S2, and so on.

Throughout the present disclosure, the term "slow-path processing" may refer generally to packet processing without any flow cache support. The term "fast-path processing" may refer generally to packet processing with flow cache support by executing a set of actions specified by flow cache information. Compared to slow-path processing, fast-path processing may be implemented more efficiently. For example, once action set 230 associated with a packet flow is cached, subsequent packets may be processed using fast path 212 instead of slow path 211. This in turn improves efficiency by reducing overhead associated with redundant packet parsing and table lookups against datapath tables. Such operations are expensive to implement, especially for each and every packet belonging to the same flow.

The term "slow-path stage" or "stage" may refer generally to computer-readable instruction or program code (e.g., function call, subroutine, protocol, etc.) that is invocable or executable during slow-path processing. The term "fast-path action" or "action" may refer generally to operation(s) recorded in a flow cache for execution during fast-path processing. For simplicity, a one-to-one mapping for (Si, Aj) is shown in FIG. 2. In practice, one-to-many mapping may be used instead, such as recording multiple actions per stage, one action per multiple stages, etc. Additionally, in some cases, it is not necessary to configure action(s) for each and every stage of slow-path processing pipeline 211.

In a network environment with decoupled control plane and data plane, configuration changes may be pushed from control plane to data plane to cause flow cache information updates. Conventionally, when a configuration change is performed (e.g., to update a networking functionality supported by a slow-path stage), an entire flow cache entry will be invalidated. For example, when stage=S3 is updated, it is necessary to invalidate all actions (A1 to AK). There are various drawbacks with such conventional approaches. For example, it is necessary to relearn the entire action set regardless of whether each and every action is affected by the configuration change. Also, it is necessary to relearn all actions regardless of whether each action is designed to alter packet information.

Granular Updates to Flow Cache Information

According to examples of the present disclosure, flow cache information for fast-path packet processing may be updated in a more efficient manner. Using a granular update approach, first action(s) affected by a configuration change may be identified and updated. In contrast, second action(s) not affected by the configuration change may be identified and not updated (i.e., maintained). This way, it is not necessary to relearn an entire set of fast-path actions for each and every configuration change made to a corresponding sequence of slow-path stages. In the following, the term "first action" may refer generally to an action that is affected by a configuration change. The term "second action" may refer generally to an action that is not affected by the configuration change. Note that a particular "second action" may be performed or executed before, or after, a particular "first action."

In practice, any improvement or optimization relating to flow cache information update will in turn improve the performance of packet processing in SDN environment 100. Although configuration changes are (ideally) not frequent by design, frequent control messages between the control plane and data plane might be observed in real-world systems. One reason is that real-world networking stack and network topologies are generally complicated. There is additional complexity relating to user's configuration as well as runtime data (e.g., of hypervisors, bare metal servers and containers) that needs to be considered by the control plane to generate proper configuration messages and ensure that the data plane functions correctly.

Figure 3:
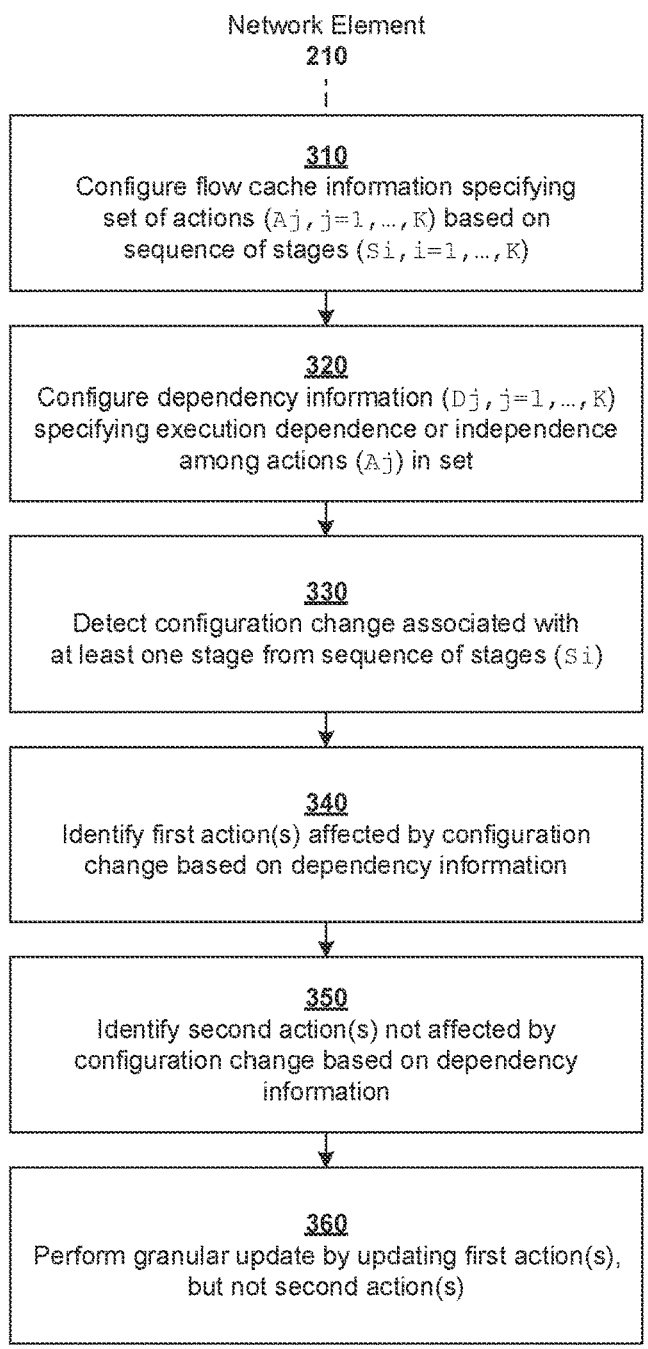
FIG. 3 is a flowchart of an example process for a network element to perform flow cache information update(s) for packet processing.

In more detail, FIG. 3 is a flowchart of example process 300 for a network element to perform flow cache information update(s) for packet processing. Example process 300 may include one or more operations, functions, or actions illustrated by one or more blocks, such as 310 to 350. The various blocks may be combined into fewer blocks, divided into additional blocks, and/or eliminated depending on the desired implementation. In the following, various examples will be explained using network element 210 in FIG. 2, which may be a logical or physical element capable of implementing slow-path and fast-path packet processing.

At 310-320 in FIG. 3, flow cache information specifying a set of actions (denoted as Aj, j=1, . . . , K) and dependency information (Dj, j=1, . . . , K) associated with the set of actions may be configured. The set of actions may be configured based on a sequence of stages (Si, j=1, ..., K) that is executable during slow-path packet processing. The dependency information may specify execution dependence or independence among actions in the set during fast-path packet processing. See 220, 230 and 240 in FIG. 2.

At 330-340 in FIG. 3, in response to detecting a configuration change associated with at least one stage from the sequence of stages, network element 210 may identify, from the set of actions, first action(s) affected by the configuration change based on the dependency information. For example in FIG. 2, first actions=(A3, A4, A5) may be affected by a configuration change (see 250) to stage=S3. In this case, block 340 may involve identifying execution dependence among first actions=(A3, A4, A5) associated with a dependency chain. For example, the configuration change may be associated with stage=S3 based on which action=A3 is configured. Based on the dependency information, the execution of A4 depends on A3 and A5 depends on A4.

At 350 in FIG. 3, in response to detecting the configuration change, network element 210 may identify, from the set of actions, second action(s) not affected by the configuration change based on the dependency information. For example in FIG. 2, second actions=(A1, A2) may not be affected by the configuration change. In this case, block 350 may involve identifying an execution independence between second actions=(A1, A2) and first actions=(A3, A4, A5). In particular, second actions=(A1, A2) may be executed before, and independently from, first actions=(A3, A4, A5).

At 360 in FIG. 3, network element 210 may perform a granular update to the flow cache information by updating first actions=(A3, A4, A5) affected by the configuration change, but not second actions=(A1, A2). As used herein, the term "granular update" may refer generally to an update that is performed at the granularity level of actions. During a particular granular update, action(s) in fast-path processing pipeline 212 may be updated (or relearned) based on corresponding stage(s) in slow-path processing pipeline 211. See 260 (first actions) and 270 (second actions) in FIG. 2.

Examples of the present disclosure may be implemented to improve flexibility relating to configuration changes, such as by allowing network functions to be plugged in or out in a less disruptive manner. For example, the "first action" identified at block 340 and updated at block 360 may be an action (e.g., A6) that is executable independently from other actions in the set. The first action may be updated by, for example, changing its parameter value(s). In this case, the first action may be an action that does not alter packet information, such as IP Flow Information Export (IPFIX), Switched Port Analyzer (SPAN), packet counting, packet tracing, network monitoring (e.g., latency measurement, port mirroring), etc. Using examples of the present disclosure, flow cache information may be updated in a granular manner as network functions are plugged in or out.

As will be described using FIGS. 4-8B, the granular update may be performed in response to detecting a packet associated with a packet flow for which the flow cache information is configured, such as between VM1 131 and VM2 132 (see 190 in FIG. 1). In this case, fast-path processing may be performed to execute second actions=(A1, A2). Network element 210 may then switch from fast-path packet processing to slow-path packet processing to perform the granular update to update first actions=(A3, A4, A5) affected by the configuration change. Depending on the desired implementation, other actions (e.g., A6 to AK) may also be relearned during slow-path packet processing. By reducing unnecessary action invalidate on and update, flow cache information may be updated partially. This in turn reduces sub-optimality with respect to flow cache update or refreshment.

Slow-Path Packet Processing

Figure 4:
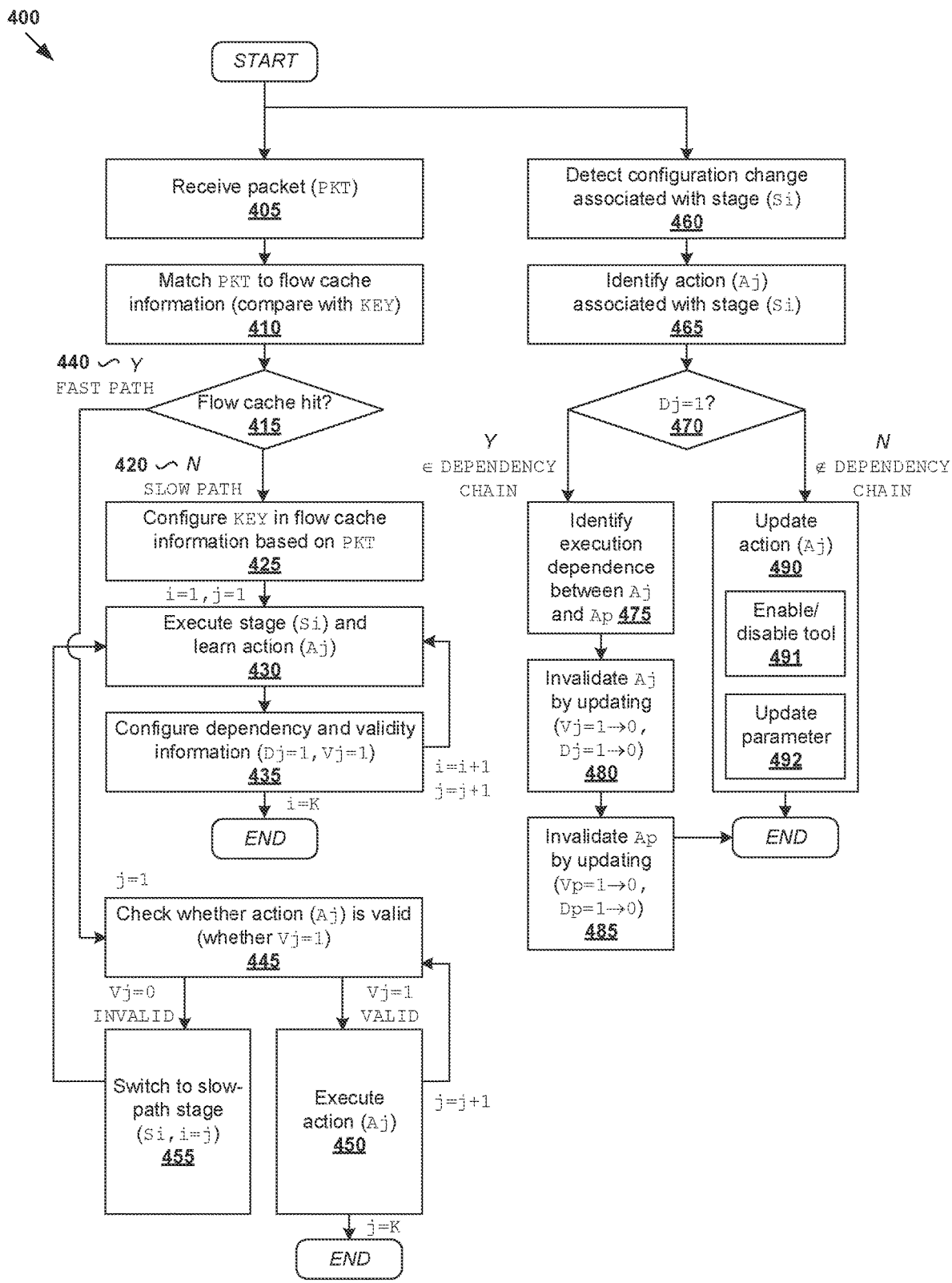
FIG. 4 is a flowchart of an example detailed process for a network element to perform flow cache information update(s) for packet processing.

FIG. 4 is a flowchart of example detailed process 400 for a network element to perform flow cache information update(s) for packet processing. Example process 400 may include one or more operations, functions, or actions illustrated at 405 to 492. The various operations, functions or actions may be combined into fewer blocks, divided into additional blocks, and/or eliminated depending on the desired implementation.

At 405, 410 and 415 in FIG. 4, in response to detecting an ingress packet associated with a packet flow, network element 210 may determine whether the packet may be matched to any flow cache information. At 420, in the case of a cache miss event (i.e., no match), network element 210 may perform slow-path packet processing and configure flow cache information to facilitate subsequent fast-path packet processing. Otherwise, at 440, in the case of a cache hit event (i.e., match found), fast-path packet processing may be performed.

During slow-path processing, at 425 in FIG. 4, network element 210 may configure a flow key (KEY) specifying match field(s) associated with the packet flow. The definition of a flow key (KEY) is generally implementation-specific and depends on the granularity and type of the packet flow(s) to be detected. The match fields may be based on the header and/or information of the ingress packet, such as five-tuple flow information=(source IP address, destination IP address, source port number, destination port number, protocol information). Other match fields may include source/destination MAC address, logical network information (e.g., VNI), etc. Depending on the desired implementation, the received packet may be an encapsulated packet that includes inner header information and outer header information (e.g., GENEVE encapsulation).

At 430 in FIG. 4, network element 210 may perform or execute a sequence of stages and configure flow cache information specifying a set of actions. This way, multiple flow cache actions (Aj, j=1, ..., K) of may be recorded or learned based on the execution of corresponding stages (Si, i=1, ..., K) during slow-path processing. Each action may be learned along with any suitable parameter value(s), such as header information extracted from the ingress packet. Further, at 435, network element 210 may configure dependency information (Dj, j=1, ..., K) and validity information (Vj, j=1, ..., K) associated with the set of actions. Bits (Dj, Vj) will be explained below.

The example in FIG. 4 will be explained using FIG. 5, which is a schematic diagram illustrating example 500 of flow cache information configuration during slow-path packet processing. For simplicity, various examples will be explained using slow-path processing pipeline 211 and fast-path processing pipeline 212 that include respective K=8 stages (see 510 in FIG. 5) and actions (see 530). In this example, in response to detecting an ingress packet (see 501) and a flow cache miss event (see 502), slow-path packet processing may be performed to execute the stages and learn corresponding actions. The stage execution generates an egress packet (see 503), which is then forwarded towards a next hop or destination via an output interface (e.g., physical or logical port) of network element 210.

Depending on the desired implementation, network element 210 may include any suitable module(s) to perform examples of the present disclosure, such as datapath module (e.g., layer-2 module, layer-3 module), flow cache module, etc. For example, each datapath module may be configured to interact with the flow cache module to configure actions, dependency information and validity information. The flow cache module may detect configuration change(s) based on message(s) from the datapath module(s), such as via application programming interfaces (APIs). The flow cache module may be configured to manage granular flow cache 520, including storing, updating and aging flow cache entries.

(a) Example Granular Flow Cache

Figure 5:
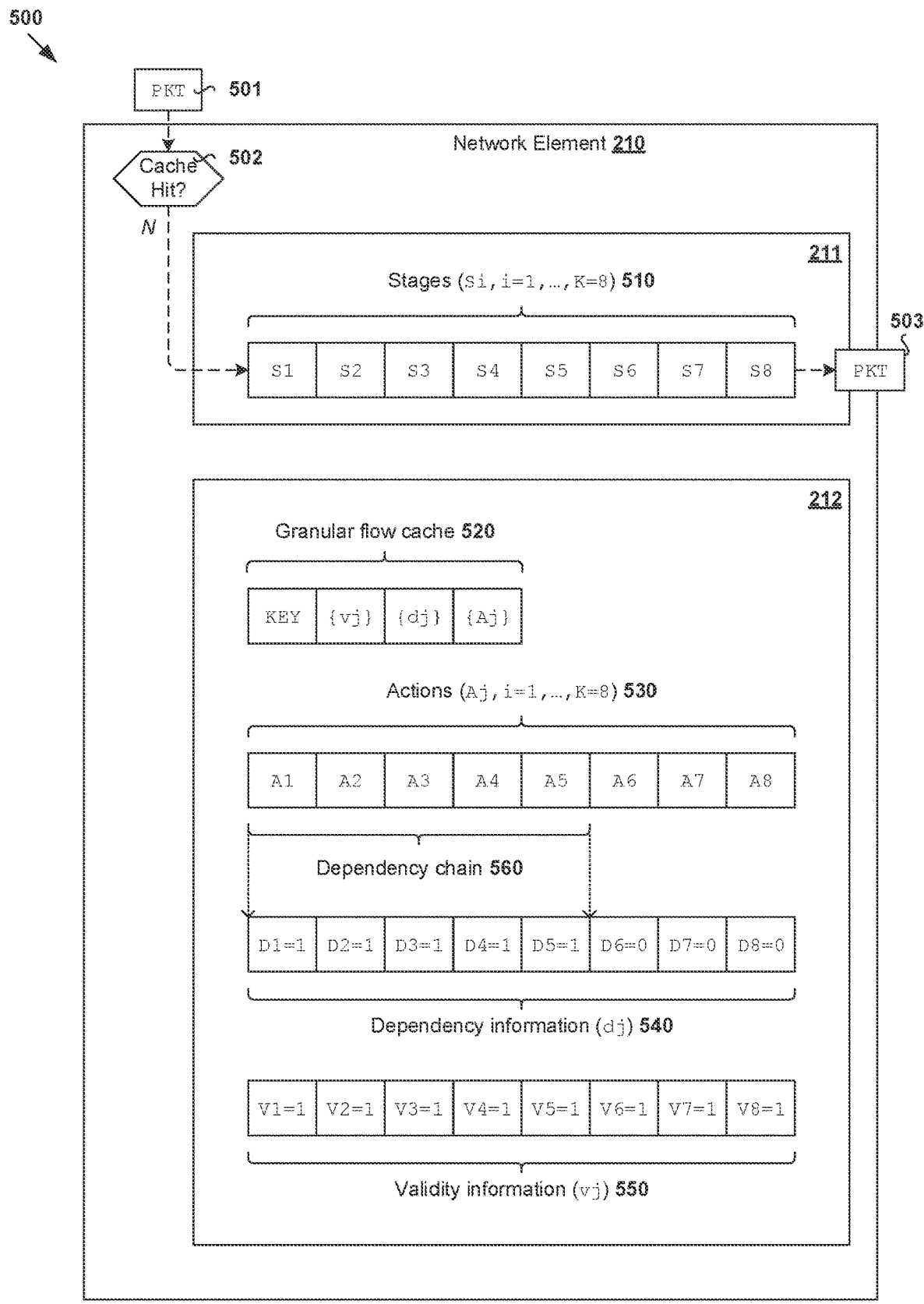
FIG. 5 is a schematic diagram illustrating an example flow cache information configuration during slow-path packet processing.

At 520 in FIG. 5, the flow cache information may be in the form of a "granular flow cache" with multiple flow cache entries for respective packet flows. Each entry in granular flow cache 520 may include a flow key=KEY; an action array specifying a set of actions={A1, . . . , A8}; dependency information={D1, . . . , D8} and validity information= {V1, . . . , V8}. For example, the action array may include K=8 slots to store respective actions. Each slot is either empty or specifies an action, subject to the validity information associated with each slot. The index of a slot may be interpreted as the rank of an action. See 530, 540 and 550 in FIG. 5.

In the example in FIG. 5, stages S1 to S5 may be part of a dependency chain, while stages S6 to S8 are not. The $i^{th}$ stage (Si) is associated with rank=i. In this case, for stages S1 to S5 in the dependency chain, rank(S1)<rank(S2)<rank (S3)<rank(S4)<rank(S5). This means that S2 is performed after S1, S3 after S2, S4 after S3 and S5 after S4. Based on stages S1 to S5, actions A1 to A5 in a dependency chain (see 560) may be configured. This means that A2 is performed or executed after A1, A3 after A2, A4 after A3 and A5 after A4. Based on the execution order in the dependency chain, actions=(A1, A2) are executed before, and independently from, A3. In contrast, actions=(A4, A5) are executed after, and therefore depends on, A3. For stages not in the dependency chain, rank(S6)<rank(S7)<rank(S8) in the example in FIG. 5.

In general, the term "dependency" or "execution dependency" may refer generally to whether the execution (or configuration) of one action depends on that of another action. In contrast, the term "rank" may refer generally to an execution order of a set of actions. For example, consider a first pair of stages: (a) S1=distributed firewall (DFW) and (b) S2=distributed layer-2 forwarding. In this case, S2 may depend on S1 because if a certain packet is rejected by S1, there is no valid action for S2. Now, consider another pair of stages: (a) S1=DFW and (b) S6=IPFIX, where rank(S1) <rank(S6). In this case, S1 is executed before S6, but S6 may be executed independently from S2. As such, configuration changes on S2 will not impact on the behaviour of S6, which performs IPFIX to collect statistics.

The above formulation may be generalized in practice. For example, in the case of M<K stages, stages $S_{x1}$ to $S_{xM}$ may be in a dependency chain, while stages $S_{y1}$ to $S_{yN}$ are not. Without loss of generality, ranks x1< . . . <xM and y1< . . . <yN, where $\forall 1 \leq m \leq M$, $\forall 1 \leq n \leq N$ and xm≠yn. Ranks of data-plane stages may be predefined to determine the sequence of stages in slow-path processing pipeline 211, and corresponding set of actions in fast-path processing pipeline 212. For all actions in a particular dependency chain, "≤" over action ranks indicates a total order for dependency relationship. Not every action is in dependency chain 560, such as A6 to A8 relating to IPFIX, SPAN, packet counting, packet tracing, network monitoring, etc.

(b) Dependency Information

At 540 in FIG. 5, the dependency information may be configured to be a K-bit vector or bitmap. Each dependency bit (Dj) indicates whether a corresponding action (Aj) belongs to a dependency chain (i.e., Dj=1) or otherwise (Dj=0). For example, D1 to D5 may be set (i.e., Dj=1 for j=1, . . . , 5) to indicate that actions A1 to A5 are in dependency chain 560. D6 to D8 are not set (i.e., Dj=0 for j=6, 7, 8) to indicate that actions A6 to A8 are not in dependency chain 560.

(c) Validity Information

At 550 in FIG. 5, the validity information may be configured to be a K-bit vector or bitmap. Each validity bit (Vj) indicates whether a corresponding action (Aj) is valid (Vj=1) or otherwise (Vj=0). An "invalid" action (Vj=0) may indicate an empty slot in the action array, or an action that has been invalidated following a configuration change (to be discussed below). For example, V1 to V8 may be set (i.e., Vj=1 for j=1, . . . , 8) to indicate that corresponding actions A1 to A8 are valid and not empty. The validity information may be used to mark non-empty action slots for quick retrieval of non-empty actions in the action array in granular flow cache 520. The validity information also reflects which actions (and corresponding stages) have been installed onto the datapath based on features enabled or disabled by users. In some cases, a subset of stages (S1, . . . , S8) are not installed or disabled. In this case, each validity bit (Vj) also indicates that a stage (Si) associated with the action (Aj) has been installed on the datapath.

Once the flow cache information is configured, fast-path processing may be performed more efficiently. For example, in response to detecting a subsequent ingress packet belonging to the same packet flow, actions A1 to A8 may be executed more efficiently compared to stages S1 to S8. For dependency chain 560, the execution of A2 depends on A1, A3 depends on A2, and so on. Outside of dependency chain 560, A6 to A8 may be executed after A1 to A5. See also 440, 445 (valid) and 450 in FIG. 4.

Configuration Change and Partial Invalidation

Figure 6:
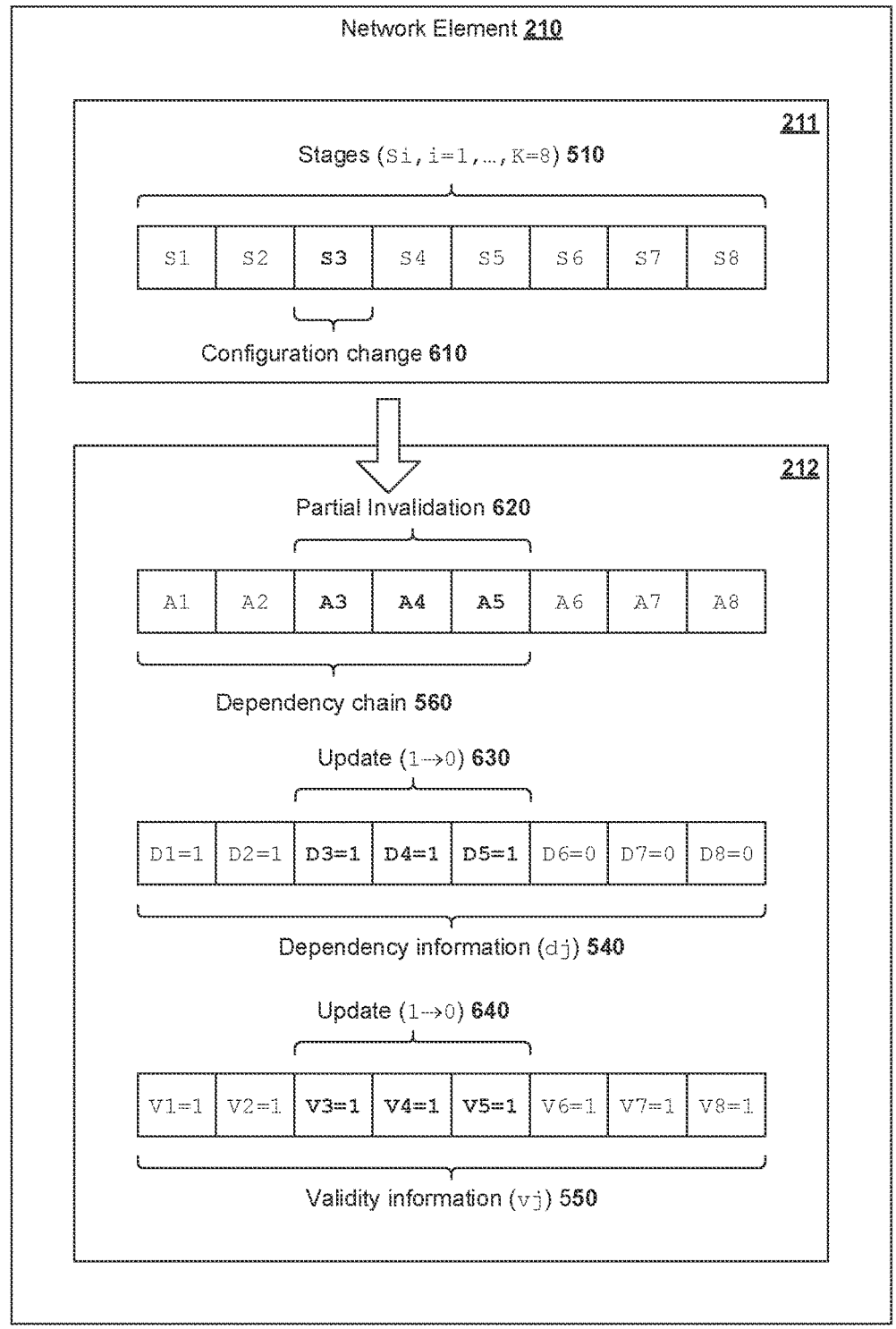
FIG. 6 is a schematic diagram illustrating an example of configuration change and action invalidation.

FIG. 6 is a schematic diagram illustrating example 600 of configuration change and action invalidation. The structure of granular flow cache 520 in FIG. 5 is not shown for simplicity. In the following, consider a configuration change (see 610) associated with stage S3 (i.e., j=3), which in turn causes the invalidation and update of the corresponding action A3.

At 610 in FIG. 6, network element 210 may detect a configuration change affecting stage S3 (i.e., j=3). Depending on the desired implementation, the detection may be based on configuration information or instructions received by network element 210 from a control-plane entity. The configuration change may be initiated to modify network function(s) performed by stage S3. As will be described using FIGS. 8A-B, configuration change(s) may also be performed to add or remove a stage from slow-path processing pipeline 211. See 460 in FIG. 4.

(a) Action in Dependency Chain

At 620 in FIG. 6, in response to detecting the configuration change, network element 210 may identify action=A3 that is configured based on stage S3. Further, based on dependency information 540, network element 210 may identify an execution dependence among (A3, A4, A5) associated with respective (D3=1, D4=1, D5=1). Using the notation in FIG. 4, actions=(A4, A5) may be denoted as Ap, for p=4, 5. Since the execution of (A4, A5) depends on A3, network element 210 may invalidate actions=(A3, A4, A5). See also 465, 470 (yes) and 475 in FIG. 4.

At 630-640 in FIG. 6, dependency information 540 and validity information 550 associated with actions (A3, A4, A5) may be updated. To indicate the invalidation, dependency bits may be cleared or updated to (D3=0, D4=0, D5=0), and validity bits to (V3=0, V4=0, V5=0). Depending on the desired implementation, if all actions belonging to a dependency chain are invalidated, the entire flow cache entry may be removed. See also 480-485 in FIG. 4.

(b) Action not in Dependency Chain

In another example (not shown in FIG. 6 for simplicity), in response to detecting a configuration change associated with stage=S7, network element 210 may identify first action=A7 (i.e., j=7). However, based on D7=0 in dependency information 540, it is determined that action=A7 is not in any dependency chain. In this case, action=A7 may be updated without affecting other actions. In practice, actions A6 to A8 may be enabled, disabled or have their parameter value(s) updated based on the configuration change. See also 470 (no), 490, 491, 492 in FIG. 4.

Using a granular flow cache, examples of the present disclosure may provide more flexibility to enable or disable network functions that do not alter packet information, such as IPFIX, SPAN, packet counting, packet tracing and latency monitoring without invalidating the set of actions. For example, packet flows that have corresponding flow cache information on network element 210 may be processed using fast-path processing pipeline 212 even if a network monitoring or measurement tool is plugged in or out or have its parameter values changed.

Granular Updates

Figure 7:
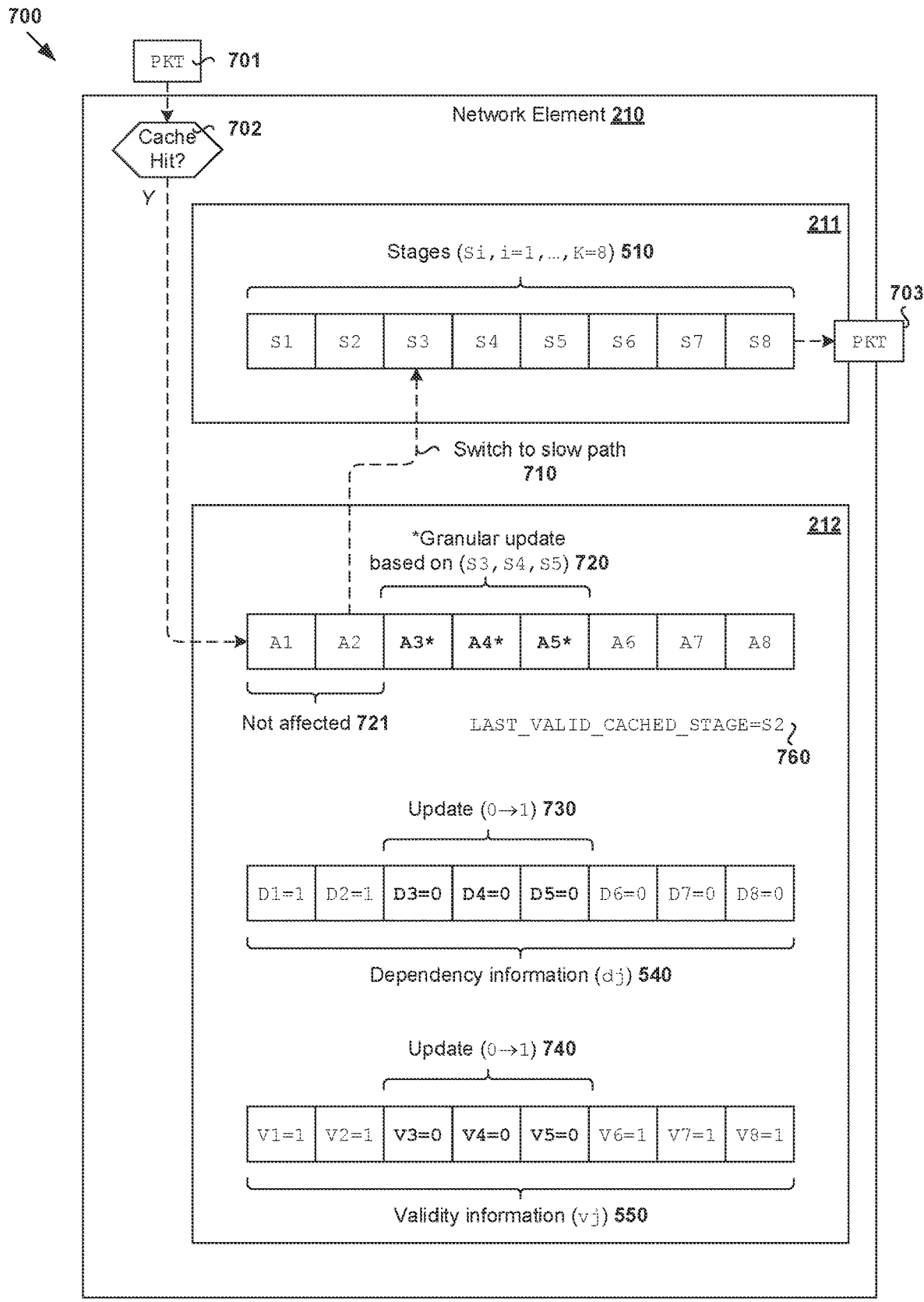
FIG. 7 is a schematic diagram illustrating a first example of flow cache information update based on the example configuration change in FIG. 6.

FIG. 7 is a schematic diagram illustrating first example 700 of flow cache information update based on the example configuration change in FIG. 6. Here, in response to detecting an ingress packet (see 701) that belongs to the same packet flow as the example in FIG. 5, network element 210 may detect a flow cache hit event (see 702) by matching the ingress packet to a flow key associated with actions A1 to A8. During fast-path processing, actions A1 and A2 may be performed in response to determination that the actions are valid based on respective (V1=1, V2=1). In other words, an execution independence may be identified between first actions=(A3, A4, A5) and second actions=(A1, A2). First actions=(A3, A4, A5) are invalidated and affected by the configuration change in FIG. 6. See 405, 410, 440 (fast path), 445-450 in FIG. 4.

At 710 in FIG. 7, network element 210 may switch from fast-path processing to slow-path processing in response to determination that action A3 has been invalidated based on corresponding validity information V3=0. In this case, after performing actions A1 and A2 of fast-path processing pipeline 212, the ingress packet is dispatched to stage S3 of slow-path processing pipeline 211. Subsequent stages S4 to S8 may be performed to generate an egress processed packet (see 703). Depending on the desired implementation, the last valid cached stage may be tracked, such as using a parameter denoted as "LAST_VALID_CACHED_STAGE"=S2 (see 760 in FIG. 7).

At 720-740 in FIG. 7, a granular update to partially invalidate the flow cache information may be performed. In particular, at 720, actions=(A3, A4, A5) may be relearned based on the execution of stages S3 to S5. At 730-740, dependency information and validity information may be updated in a granular manner by resetting associated bits from (Dj=0, Vj=0) to (Dj=1, Vj=1) for j=3, 4, 5. See 455 (which leads to 430-435) in FIG. 4.

Using examples of the present disclosure, a subset of first actions (e.g., A3 to A5) may be invalidated and updated based on the dependency information in response to a configuration change. In the example in FIG. 7, since stages S6 to S8 have not been updated and actions A6 to A8 are not in dependency chain 560 (i.e., D6=D7=D8=0), it may not be necessary to relearn A6 to A8. The granular update in FIG. 7 should be contrasted against conventional approaches that necessitate the invalidation and relearning of the entire set of actions (e.g., A1 to A8).

Other Configuration Changes

Depending on the desired implementation, configuration change(s) may be performed to add or remove a stage to slow-path processing pipeline 211. Some examples will be discussed using FIGS. 8A-B. FIG. 8A is a schematic diagram illustrating second example 810 of flow cache information update based on a configuration change; and FIG. 8B is a schematic diagram illustrating third example 820 of flow cache information update based on a configuration change.

(a) Addition

At 810 in FIG. 8A, consider a configuration change to add a stage to the datapath, such as by enabling or installing stage=S3 that is previously disabled. Prior to the configuration change, the validity and dependency information bits for corresponding A3 are cleared; see V3=0 and D3=0. The last valid cache stage may also be tracked, such as LAST_VALID_CACHED_STAGE=S2 (see 813).

In response to the configuration change, network element 210 may configure or learn action=A3 based on stage=S3 during slow-path processing (see 811). Once configured, the validity and dependency information bits for action=A3 may be set. See V3=1 and D3=1 at 812. During fast-path packet processing for a subsequent packet belonging to the same flow, valid actions A1 to A8 may be executed.

(b) Removal

At 820 in FIG. 8B, consider a configuration change to remove a stage from the datapath, such as by disabling stage=S4 that has been previously installed. Prior to the configuration change, the validity and dependency information bits for corresponding A4 are set; see V4=1 and D4=1. In response to the configuration change, network element 210 may invalidate action=A4 (see 821) by clearing the validity information bit (i.e., V4=0) and dependency information bit (i.e., D4=0). This is to indicate that action=A4 is invalid and should not be executed during fast-path packet processing (see 822). The last valid cache stage may also be tracked, such as LAST_VALID_CACHED_STAGE=S3 (see 823).

During fast-path packet processing for a subsequent packet belonging to the same flow, valid actions A1 to A3 may be performed before the packet is dispatched to stage=S4. In this case, since stage=S4 has been disabled, corresponding action=A4 will not be learned. In a different scenario where a relearn is required, however, an action may be learned along with new parameter value(s).

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8B, container technologies may be used to run various containers inside respective VMs 130-133. Containers are "OS-less", meaning that they do not include any OS that could weigh 10s of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8B.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a network element to perform flow cache information update for packet processing, the method comprising:
    configuring flow cache information specifying a set of actions based on a sequence of stages that is executable during slow-path packet processing;
    configuring dependency information specifying execution dependence or independence among actions in the set during fast-path packet processing, wherein the specified execution dependence indicates which of the actions in the set are in a dependency chain, wherein the specified execution independence indicates which of the actions in the set are outside of the dependency chain, and wherein the dependency chain indicates whether execution of an action in the dependency chain depends upon execution of another action in the dependency chain; and
    in response to detecting a configuration change associated with at least one stage from the sequence of stages:
        identifying, from the set of actions, at least one first action in the dependency chain that is affected by the configuration change based on the execution dependence specified by the dependency information;
        identifying, from the set of actions, at least one second action outside of the dependency chain that is not affected by the configuration change based on the execution independence specified by the dependency information; and
        performing a granular update to the flow cache information by updating the at least one first action, but not the at least one second action.

2. The method of claim 1, wherein performing the granular update to the flow cache information comprises:
    in response to detecting a packet associated with the packet flow for which the flow cache information is configured, performing fast-path packet processing to execute the at least one second action.

3. The method of claim 2, wherein performing the granular update to the flow cache information comprises:
    switching from fast-path packet processing to slow-path packet processing to perform the granular update to update the at least one first action.

4. The method of claim 1, wherein identifying the at least one first action comprises:
    based on the dependency information, identifying an execution dependence among multiple first actions during fast-path packet processing, wherein the multiple first actions are in the dependency chain, wherein the at least one first action, amongst the multiple first actions, is executed before and independently of a specific first action in the dependency chain based on an execution order provided by the dependency chain, and wherein at least another first action, amongst the multiple first actions, is executed after and depends upon the specific first action in the dependency chain based on the execution order provided by the dependency chain.

5. The method of claim 4, wherein identifying the at least one first action comprises:
    invalidating the multiple first actions by updating validity information that includes multiple bits associated with respective actions in the set, wherein a particular bit is updated to indicate that a particular first action is invalid.

6. The method of claim 1, wherein identifying the at least one second action comprises:
    based on the dependency information, identifying an execution independence between the at least one second action and the at least one first action during fast-path packet processing.

7. The method of claim 1, wherein identifying the at least one first action comprises:
    identifying the first action that is executable independently from other actions in the set, wherein the first action is associated with one or more of: internet protocol flow information export (IPFIX), switched port analyzer (SPAN), packet counting, packet tracing, and network monitoring.

8. A non-transitory computer-readable storage medium that includes a set of instructions which, in response to execution by a processor of a computer system, cause the processor to perform a method of flow cache information update for packet processing, wherein the method comprises:
    configuring flow cache information specifying a set of actions based on a sequence of stages that is executable during slow-path packet processing;
    configuring dependency information specifying execution dependence or independence among actions in the set during fast-path packet processing, wherein the specified execution dependence indicates which of the actions in the set are in a dependency chain, wherein the specified execution independence indicates which of the actions in the set are outside of the dependency chain, and wherein the dependency chain indicates whether execution of an action in the dependency chain depends upon execution of another action in the dependency chain; and
    in response to detecting a configuration change associated with at least one stage from the sequence of stages:
        identifying, from the set of actions, at least one first action in the dependency chain that is affected by the configuration change based on the execution dependence specified by the dependency information;
        identifying, from the set of actions, at least one second action outside of the dependency chain that is not affected by the configuration change based on the execution independence specified by the dependency information; and
        performing a granular update to the flow cache information by updating the at least one first action, but not the at least one second action.

9. The non-transitory computer-readable storage medium of claim 8, wherein performing the granular update to the flow cache information comprises:
    in response to detecting a packet associated with the packet flow for which the flow cache information is configured, performing fast-path packet processing to execute the at least one second action.

10. The non-transitory computer-readable storage medium of claim 9, wherein performing the granular update to the flow cache information comprises:
    switching from fast-path packet processing to slow-path packet processing to perform the granular update to update the at least one first action.

11. The non-transitory computer-readable storage medium of claim 8, wherein identifying the at least one first action comprises:
    based on the dependency information, identifying an execution dependence among multiple first actions during fast-path packet processing, wherein the multiple first actions are in the dependency chain, wherein the at least one first action, amongst the multiple first actions, is executed before and independently of a specific first action in the dependency chain based on an execution order provided by the dependency chain, and wherein at least another first action, amongst the multiple first actions, is executed after and depends upon the specific first action in the dependency chain based on the execution order provided by the dependency chain.

12. The non-transitory computer-readable storage medium of claim 11, wherein identifying the at least one first action comprises:
    invalidating the multiple first actions by updating validity information that includes multiple bits associated with respective actions in the set, wherein a particular bit is updated to indicate that a particular first action is invalid.

13. The non-transitory computer-readable storage medium of claim 8, wherein identifying the at least one second action comprises:
    based on the dependency information, identifying an execution independence between the at least one second action and the at least one first action during fast-path packet processing.

14. The non-transitory computer-readable storage medium of claim 8, wherein identifying the at least one first action comprises:
    identifying the first action that is executable independently from other actions in the set, wherein the first action is associated with one or more of: internet protocol flow information export (IPFIX), switched port analyzer (SPAN), packet counting, packet tracing, and network monitoring.

15. A network element, comprising:
    a flow cache to facilitate fast-path packet processing; and
    a processor to:
        configure, in the flow cache, flow cache information specifying a set of actions based on a sequence of stages that is executable during slow-path packet processing;
        configure, in the flow cache, dependency information specifying execution dependence or independence among actions in the set during fast-path packet processing, wherein the specified execution dependence indicates which of the actions in the set are in a dependency chain, wherein the specified execution independence indicates which of the actions in the set are outside of the dependency chain, and wherein the dependency chain indicates whether execution of an action in the dependency chain depends upon execution of another action in the dependency chain; and
        in response to detecting a configuration change associated with at least one stage from the sequence of stages:
            identify, from the set of actions, at least one first action in the dependency chain that is affected by the configuration change based on the execution dependence specified by the dependency information;
            identify, from the set of actions, at least one second action outside of the dependency chain that is not affected by the configuration change based on the execution independence specified by the dependency information; and perform a granular update to the flow cache information by updating the at least one first action, but not the at least one second action.

16. The network element of claim 15, wherein the processor is to perform the granular update to the flow cache information by performing:

in response to detecting a packet associated with the packet flow for which the flow cache information is configured, perform fast-path packet processing to execute the at least one second action.

17. The network element of claim 16, wherein the processor is to perform the granular update to the flow cache information by performing:

switch from fast-path packet processing to slow-path packet processing to perform the granular update to update the at least one first action.

18. The network element of claim 15, wherein the processor is to identify the at least one first action by performing:

based on the dependency information, identify an execution dependence among multiple first actions during fast-path packet processing, wherein the multiple first actions are in the dependency chain, wherein the at least one first action, amongst the multiple first actions, is executed before and independently of a specific first action in the dependency chain based on an execution order provided by the dependency chain, and wherein at least another first action, amongst the multiple first actions, is executed after and depends upon the specific first action in the dependency chain based on the execution order provided by the dependency chain.

19. The network element of claim 18, wherein the processor is to identify the at least one first action by performing:

invalidate the multiple first actions by updating validity information that includes multiple bits associated with respective actions in the set, wherein a particular bit is updated to indicate that a particular first action is invalid.

20. The network element of claim 15, wherein the processor is to identify the at least one second action by performing:

based on the dependency information, identify an execution independence between the at least one second action and the at least one first action during fast-path packet processing.

21. The network element of claim 15, wherein the processor is to identify the at least one first action by performing:

identify the first action in the form of an action that is executable independently from other actions in the set, wherein the first action is associated with one or more of: internet protocol flow information export (IPFIX), switched port analyzer (SPAN), packet counting, packet tracing, and network monitoring.

* * * * *